Patented Jan. 16, 1940

2,187,563

UNITED STATES PATENT OFFICE 2,187,563

ARTICLE OF MANUFACTURE

Raymond E. Thomas, Newburgh, N. Y., assignor to E. I. du Pont de Nemours & Company, Wilmington, Del., a corporation of Delaware No Drawing. Application June 22, 1937, Serial No. 149,665

6 Claims. (Cl. 91—68)

This invention relates to pressure sensitive adhesive tapes, and more particularly to water repellent surgical plasters.

For many years it has been the practice of manufacturers of surgical adhesive tape and medical plasters to apply in some suitable or convenient manner, such as spreading or calendering, a pressure sensitive adhesive mass to a woven fabric (usually of close construction). An objection to such plasters is that the fabric side (i. e., the side opposite the pressure sensitive adhesive) wets and soils readily when in use. Because of the character of the fabric (high water absorbency and nap) the soiled surface cannot readily be cleaned. Consequently when in use such plasters quickly become unsightly. In some cases the objectionable plaster may be replaced by fresh material, but in many instances this is not only difficult but undesirable and impractical.

In United States Patent 1,877,344 of September 13, 1932, it has been proposed that a continuous water repellent film be spread upon one side of the adhesive tape backing and thereafter the pressure sensitive adhesive applied to the other side. The materials proposed for said continuous film or enamel are cellulose acetate lacquers, cellulose nitrate lacquers, and viscose solutions (sic). This procedure is objectionable because the coatings may render the material too heavy or too stiff to use on certain portions of the body, for example, the ankle. When such fully coated material is used in such locations it does not satisfactorily drape or conform to the contours with the result that there is obtained faulty binding or dressing. The glazes or coatings proposed in this patent have additional objections. Cellulose acetate lacquers capable of producing a surgical tape backing having proper softness and no other properties which would prohibit its use, probably cannot be prepared from the present state of the art. Viscose solutions (and the regenerated product) are notoriously water sensitive. The nitro cellulose lacquers commonly employed are known to rapidly deteriorate rubber base pressure sensitive adhesives.

This invention had for an object the preparation of water repellent non-soiling adhesive tape capable of conforming to irregularly curved surfaces. Other objects were the preparation of adhesive tapes which would readily shed water, which would not become water logged even when immersed in water, which would not quickly lose their usefulness because of rapid deterioration of the pressure sensitive adhesive, which would have backings of desirable softness without undesirable stickiness, and which would have water insensitive backings. A still further object was to treat a surgical plaster backing fabric in such a way as to confer upon it desirable water repellent properties not normally possessed without destroying the appearance of the fabric weave. A general advance in the art and other objects which will appear hereinafter are also contemplated.

It has now been found that a satisfactory adhesive tape may be prepared by impregnating a woven fabric with a wax-aluminum acetate-deacetylated chitin composition, drying, and thereafter anchoring on one side a rubber base pressure sensitive adhesive.

The foregoing objects and related ends are accomplished by the present invention. In the following specific examples are disclosed certain embodiments of the invention as well as details of what is believed to be the best mode for carrying out the invention. The quantities are given in parts by weight throughout the application.

Example I

A plain weave cotton fabric weighing approximately 3.7 ounces per linear yard 40 inches wide, having a yarn count of 80 x 80 and bleached by conventional methods, was rendered water repellent by giving it three ends through an impregnating bath consisting of:

|  | Per cent |
|---|---|
| Emulsion 9 | 89.3 |
| Water | 10.7 |

The material referred to above as "Emulsion 9" is an emulsion comprising deacetylated chitin, paraffin wax, glacial acetic acid, and aluminum acetate, and whose preparation is described in Example IX of United States Patent 2,047,217 of July 14, 1936. During the impregnation of the cloth, the impregnating bath was maintained at a temperature of approximately 170° F. (77° C.). The impregnated fabric was then dried in a tenter frame holding the fabric to the original width.

The fabric before treatment absorbed water in much the same way as blotting paper. After the above described treatment it was "non-wetting" and "water repellent."

The term "water repellent" is used to describe the ability of the fabric to withstand a shower of water on its surface without any penetration of water through the fabric to the reverse side. A suitable procedure for determining water repellency is that described by Matthews in "The Textile Fibers," 4th Ed. (1924) Wiley—page 991. This test is described as follows:

"Dry the pieces of fabric used in conducting the funnel test at 45° C. for 24 hours, hang in laboratory over night and clamp loosely in frame. Set the frame in a holder attached to a trough at an angle of 45 degrees. Allow clear tap water at room temperature to fall a height of 6 feet upon the central portion of the fabric, covering an area of about 8 inches in circumference for 24 hours, from a 2¾ inch brass spray nozzle having 25 holes, each 1.9 (0.75 in.) mm. in diameter, at a rate of 1000 cc. per minute.

"Inspect the condition of the underside of the fabric at the end of five minutes, one-half hour, one hour, three hours, seven hours, and twenty-four hours. Note at each inspection whether the under surface is dry, damp or wet with no dripping; damp or wet with dripping."

It will be appreciated that a water repellent fabric is not necessarily resistant to the passage of water under hydrostatic pressure.

The water repellent fabric was then coated with a pressure sensitive adhesive having the composition:

| | Per cent |
|---|---|
| India rubber | 8.1 |
| Rosin | 7.7 |
| Zinc oxide | 12.1 |
| Wool fat | 12.1 |
| Benzene | 60. | and compounded by mixing the rubber with the benzene in the ratio of 14.3 parts of the former to 85.7 parts of the latter until a uniform colloidal solution was produced. The rosin was dissolved in its own weight of benzene and strained. The zinc oxide was dried at 100° C. and mixed with benzene in the ratio of 73.4 parts to 26.6 parts of benzene until a thick paste was formed. The wool fat was incorporated into the zinc oxide paste, which was then thoroughly mixed with the rosin and rubber solutions and the product allowed to stand a few hours before spreading.

The coating operation was carried out by passing the impregnated fabric through a series of three calender rolls adjusted so that not less than 1.5 grams of the non-volatile components of the pressure sensitive mass were spread over each 100 square centimeters of the cloth. This is equivalent to 4.4 ounces per square yard.

Since the primary purpose of the present invention is the production of a surgical adhesive tape, the preferred fabric is a plain (or sheeting) weave having a yarn count of 80 x 80. Other fabrics may be satisfactorily used for the same or other purposes. Mention may be made of broadcloth and special weave fabrics such as pajama check. The choice of the fabric, as will be clear to those skilled in the art, is determined largely by the use to which the material is to be put. The fabric of Example I is known as Stevens cloth.

The preferred water repellent impregnating composition is disclosed in Example I. Other compositions (for example, those mentioned in United States of America Patent 2,047,217) may be desirably utilized. Other wax-aluminum acetate-acetic acid water proofing compositions may be used, but they have not been found as satisfactory as the ones previously mentioned. Special mention may be made of Japan wax, Carnuba and Candelilla waxes. The method of application of the water repellent composition described in Example I appears to be superior to a process wherein the fabric is first passed through a wax dispersion and thereafter through an aqueous aluminum acetate solution.

In Example I the fabric base was impregnated by being passed continuously through an impregnating bath. Reference may be made to 2,047,217 for further details of the various modes of application of the impregnating material to cloth.

A wide variety of pressure sensitive adhesives may be employed in the present invention. Those set out herein are merely illustrative, many such compositions being known to the workers in the art. For further details reference is made to "The Chemical Formulary", vol. 2—Bennett, and "The Pharmacopeia of the United States" eleventh decennial revision (1936). Such compositions usually consist of rubber, rosin or resins, wax or oil, and a filler or absorbent powder (for example, zinc oxide, orris root, and starch).

For convenience in spreading, the adhesive mass should be free from nodules. Especially desirable results have been obtained with compositions containing approximately 20% of pure rubber based on the non-volatile components of the composition. Zinc oxide, if used, preferably constitutes 20% to 30% of the composition on the same basis. The volatile solvent of the spreading mass may vary widely, although 40% to 50% is usually used.

The amount of pressure sensitive adhesive applied usually runs between 5.5 and 7. ounces per square yard. The intermediate range of 6.2 to 6.7 has been found to be the most desirable for ordinary surgical tape.

*Example II*

Another preferred pressure sensitive adhesive mass consists of:

| | Per cent |
|---|---|
| Caoutchouc | 10 |
| Zinc oxide | 5 |
| Mineral oil | 35 |
| Benzene | 50 | combined by mixing the caoutchouc with the benzene until thoroughly dissolved, and thereafter mixing with a cream or paste formed by thoroughly mixing the zinc oxide with the mineral oil.

The uses of the invention are manifest and manifold. A surgical adhesive tape having the aforementioned properties has long been sought by the trade.

The tapes of this invention are water repellent but not heavily coated, are cleanable but not stiff, and are long wearing although not continuously coated. In addition the base fabric is coated with a material resistant to soiling which does not substantially affect the pliability or appearance thereof. The completed tape has the important advantage of being non-wicking without being continuously coated.

As many apparently widely different embodiments of this invention may be made without departing from the spirit and scope thereof, it is to be understood that I do not limit myself to the specific embodiments thereof except as defined in the appended claims.

I claim:

1. The process of preparing surgical tape which comprises impregnating a cloth base with an emulsion containing deacetylated chitin, removing the volatile phase, drying the impregnated cloth and thereafter applying a pressure sensitive adhesive containing uncured rubber, said emulsion having sufficient solids to produce a discontinuous film of the deacetylated chitin after the solid phase has been removed.

2. Process of claim 1 in which the emulsion contains a wax in addition to the deacetylated chitin.

3. The process of claim 1 in which the emulsion contains aluminum acetate.

4. A flexible surgical tape comprising a cloth base impregnated with an emulsion containing deacetylated chitin in amount sufficient to render the cloth water repellent but insufficient in amount to form a continuous film of solids when dry, said tape having a pressure sensitive adhesive containing uncured rubber on one side.

5. The product of claim 4 in which the emulsion comprises deacetylated chitin and a wax.

6. The product of claim 4 in which the emulsion contains a wax, deacetylated chitin, and aluminum acetate.

RAYMOND E. THOMAS.